July 4, 1961
A. C. SAMPIETRO
2,991,130
LOAD CONTROLLED BRAKE SYSTEM
Filed Aug. 23, 1956
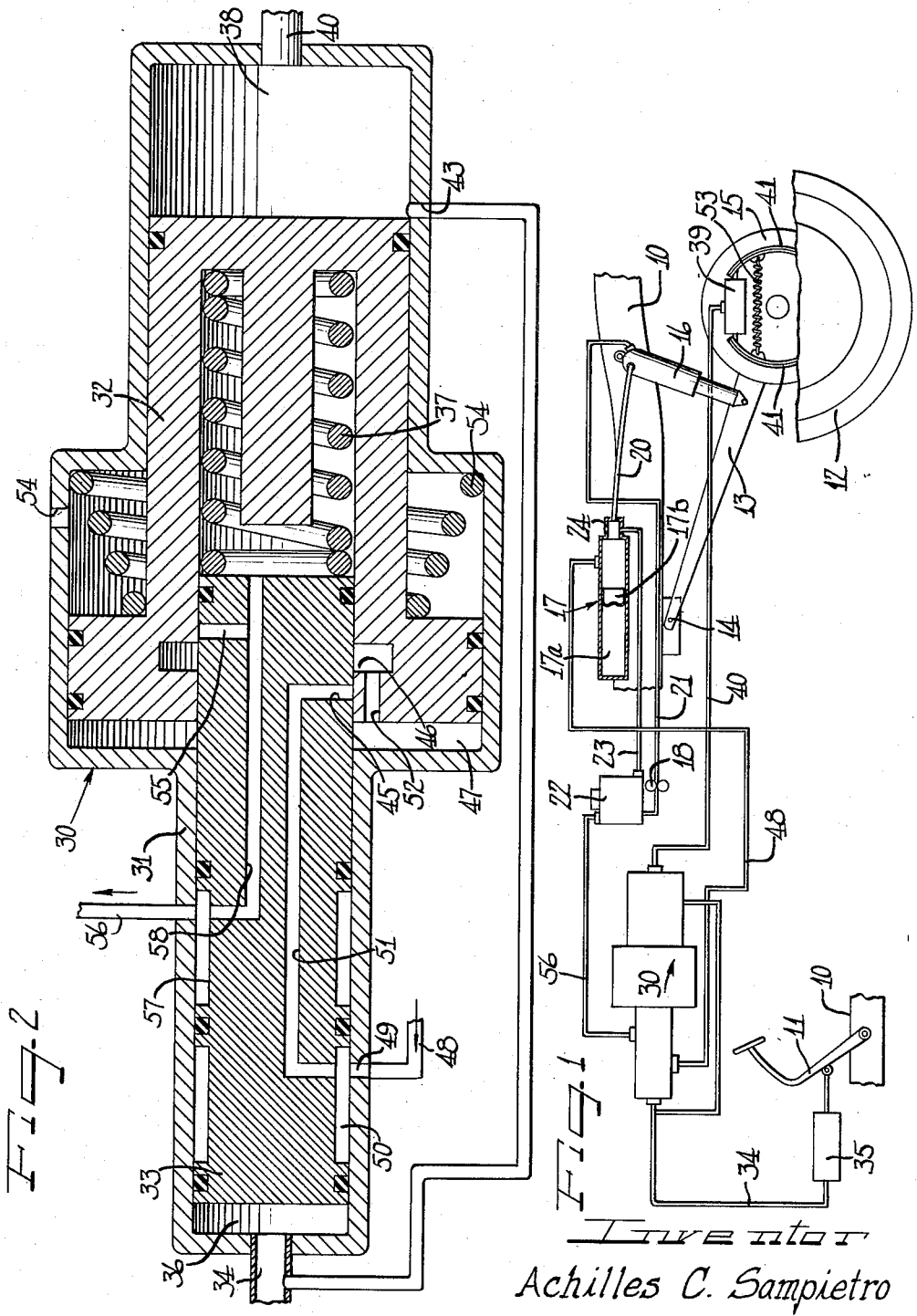
Inventor
Achilles C. Sampietro United States Patent Office 2,991,130
Patented July 4, 1961

2,991,130
LOAD CONTROLLED BRAKE SYSTEM
Achilles Charles Sampietro, Detroit, Mich., assignor to Thompson Ramo Wooldridge Inc., a corporation of Ohio
Filed Aug. 23, 1956, Ser. No. 605,834
2 Claims. (Cl. 303—22)

The present invention relates to the brake system for vehicles and is, more particularly, concerned with the provision of an improved automatic system for varying the force applied to individual vehicle wheel brakes in accordance with the vehicle load thereon.

As those skilled in the field of vehicular control are aware, adequate control of the vehicle requires a variation in the amount of braking force applied to an individual vehicle wheel in accordance with the load thereon. For example, efficient braking requires the application of a relatively small braking force to a wheel carrying a small load. If a large braking force is applied to a lightly loaded wheel, the wheel will lock and skidding will result. On the other hand, if brakes are adjusted to provide only a light braking force and the load on the vehicle wheel is increased, insufficient braking force will be provided to cause a satisfactorily rapid stop.

I am, of course, aware of the fact that complex systems have been employed in connection with railroad vehicles for adjusting the braking forces available at the railroad vehicle wheel in accordance with the load in the vehicle. However, the present invention contemplates an automatic control of the braking forces in such a manner that increased braking forces are applied with increased load without any manual adjustments being made by the vehicle operator.

In accordance with the principles of the present invention, a variable pressure source of hydraulic fluid is provided. Means are further provided for controlling the variable source to provide an increased pressure at said source with an increase in vehicle load. In accordance with the present invention, the control provided is arranged to provide a variation in pressure either at the individual wheels of the vehicle, at which the braking force is applied, or, alternatively, one fluid pressure outlet from the control may be supplied to both front wheels and/or both rear wheels simultaneously.

The functions above described are achieved in accordance with the principles of the present invention through the utilization of a fluid pressure developed in a fluid leveling system. Such a system, of which several are now known in the art, provides a pressurized fluid, either liquid or gas suspension wherein the vehicle body is maintained at a predetermined, substantially constant, height or level above the road surface. The pressure necessary to maintain the automotive vehicle at a predetermined height, will, of course, increase as the vehicle is loaded thereby providing a confined volume of fluid under a pressure varying directly with the load of the vehicle. In further accordance with the present invention, the confined fluid of the leveling system is directed to a power booster applied to the vehicle brakes. There, the variable source of fluid pressure from the leveling system is applied to the brakes to thereby provide a braking force likewise directly related to the load on the vehicle. As a result of this application of a varying braking force to the vehicle wheels, complete control of the braking surfaces of the vehicle is assured.

It is, accordingly, an object of the present invention to provide an improved power assisted brake system for vehicles or the like.

Another object of the present invention is to provide an improved power-assist hydraulic brake system wherein the pressures applied to the brake surfaces vary with the load on the vehicle.

Still another object of the present invention is to provide a variable force braking system for wheeled vehicles wherein the magnitude of brake application is automatically adjusted in accordance with the vehicle load being braked.

Still a further object of the present invention is to provide a vehicle brake system for utilization in combination with a vehicle body leveling system to provide increased braking force with increased vehicle body load.

A feature of the invention resides in the provision of a hydraulic connection between the hydraulic vehicle body leveling apparatus and a power brake booster.

Still other and further objects and features of the present invention will once become apparent to those skilled in the art from a consideration of the attached drawing wherein a preferred form of the invention is shown, by way of illustration only, and wherein FIGURE 1 is a diagrammatic illustration of the overall braking and leveling system of the present invention; and FIGURE 2 is an enlarged view, in cross section, of the power brake apparatus utilized in accordance with the present invention.

As shown in the drawings:

As may be seen from a consideration of FIGURE 1, a vehicle frame is diagrammatically illustrated at 10 and supports a brake pedal 11 and a plurality of wheels 12. The wheel 12 illustrated comprises a rear vehicle wheel and is suspended by means of a conventional trailing link 13 pivotally supported at 14 on the frame 10. The link 13 carries a brake backing plate 15 secured at the outer end thereof and is positioned relative to the frame 10 by means of a hydraulic leveling strut 16 acting in cooperation with a hydraulic-pneumatic spring 17 and a fluid pressure pump 18.

The leveling strut 16 may be constructed in any conventional manner and its particular construction is not considered a part of the present invention. It is necessary, however, that it comprise a strut or leveling unit constructed so that the weight of the vehicle body over the wheel 12 is carried by the fluid within the strut 16. The load accordingly forces fluid into a hydraulic-pneumatic spring 17 via conduit 20. The chamber 17a is filled with a compressed gas and the hydraulic fluid in the chamber 17b moves back and forth against the compressed gas 17a to provide a resilient springing action. Hydraulic fluid may be added to the strut and spring by means of a pump 18 and conduit 21, under the control of a leveling valve which is peferably incorporated within the strut 16. As the weight of the vehicle, imposed on frame 10, increases, the valve opens to permit an addition of fluid under pressure from the pump 18, into the strut 16 re-extending the strut to provide the proper vehicle level. Hydraulic fluid is returned from the spring to the reservoir 22 via conduit 23, under the control of a restricted orifice continuous flow by-pass 24. The specific construction of the leveling system may be more fully understood from a consideration of the prior patent application of John P. Heiss, Serial No. 534,121, now Patent No. 2,957,702. Such a continuous flow system is very satisfactory in connection with the present invention. As above noted various leveling systems may be employed as long as the chosen system provides a volume of fluid under pressure supporting the weight of the vehicle.

In a conventional automobile which weighs approximately 4,000 lbs., it will be apparent that approximately 1,000 lbs. will be applied at each of the wheels. Accordingly, depending upon the piston diameter of the strut 16, a fluid pressure of relatively great value is provided in the strut. This fluid pressure in many cases approximates 800 lbs. per sq. in. or more. As load is applied to the vehicle, the pressure will, of course, increase and, if the load is substantially released from the vehicle at any given point as a result of acceleration or deceleration forces tending to shift the point of application of vehicle forces, the pressure will substantially reduce.

As explained above, it has been found extremely desirable to prevent the application of heavy braking forces to a lightly loaded vehicle wheel, in order to prevent locking of the wheel relative to the brake backing plate and a resulting tendency for the vehicle to skid. The present invention utilizes the varying hydraulic fluid pressure in the leveling strut 16 to energize a power booster under the control of a manual foot pedal, for applying the vehicle brake controlling the wheel adjacent the leveling strut. By providing a power boost construction in which the power outlet is proportional to the vehicle load, application of the individual brakes will be accomplished with a braking force directly reflecting the load over the respective vehicle wheel.

Operation of a brake power booster constructed in accordance with the present invention may be seen from a consideration of FIGURE 2. As there shown, the booster 30 has a housing 31 carrying a braking piston 32 and a control piston 33. Hydraulic fluid enters the booster via conduit 34 connected to the manual brake master cylinder 35, under a fluid pressure reflecting the application of manual effort to the brake pedal 11. Hydraulic fluid entering chamber 36 via conduit 34 acts to move the control piston 33 toward the right which in turn, through the spring 37, urges the piston 32 toward the right to move fluid in the chamber 38 out to the respective brake 39 via conduit 40. A build up of a moderate manual braking pressure in the chamber 38, reflecting the expansion of the brake shoes 41 against the wheel carried brake drum will permit the piston 32 to cover the conduit 43, thereby confining hydraulic fluid in the chamber 38 and the conduit 40. Further braking effort, in the form of pressure against the control piston 33 will cause compression of the spring 37 with a transmission of such force through the spring to the fluid in the chamber 38 via piston 32. As the spring 37 is compressed, port 45 in the control piston 33 becomes aligned with port 46 in piston 32 thereby directing hydraulic fluid under pressure from the hydraulic-pneumatic spring 17 to the chamber 47 via conduit 48, port 49, groove 50, conduit 51, ports 45, 46 and the short conduit 52. The application of this pressure to chamber 47, against the rear face of the braking piston 32 provides a power boost acting against the fluid confined in the chamber 38 and applying a braking force generally proportional to the fluid pressure in the chamber 47.

Since the maximum fluid pressure in the chamber 47 will correspond substantially with the pressure in the spring 17 of the leveling system, as above noted, and the pressure in the spring 17 will vary directly as the weight of the vehicle on the leveling strut 16 varies, the maximum braking pressure at the brake piston 32 will increase with an increase in body load. Likewise, as the weight of the vehicle is shifted off of the leveling strut 16 as a result of cornering, acceleration, deceleration, or other instantaneous vehicular condition, the power braking pressure available for vehicle braking at the wheel 12 will substantially decrease. At the same time, of course, a corresponding increase occurs at some other wheel of the vehicle to which point the weight has temporarily shifted.

As was pointed out above, the pressure in the individual leveling strut of the vehicle suspension will ordinarily be sufficient to carry a vehicle load of approximately 1,000 lbs. If it is found that such pressure is so high, in connection with the area of the brake piston 32 affected by the pressure in chamber 47, as to prevent utilization of the maximum braking pressure, a restriction may be placed in the conduit 48 to reduce the pressure therein to a value sufficiently low to exercise a variable braking effort on the piston 32, as above described.

Upon removal of the braking effort from the pedal 11, and the resultant reduction in pressure in the chamber 36, the brake spring 53, at the wheel will force the brake fluid back into chamber 38, and move the brake piston 32 toward the left. The spring 54 will also act to move the piston 32 toward the left. This movement will vent the chamber 38 to port 43 permitting hydraulic brake fluid to enter the chamber 38 to make up any losses thay may from time to time occur in the hydraulic system. At the same time, spring 37 will urge the control piston 33 to the left causing the port 55 to line up with port 46, venting the fluid in chamber 47 to the reservoir 22 via conduit 56, groove 57 and conduit 58. It will be noted that movement of the control piston 33 relative to the brake piston 32 sufficient to cause such venting, will at the same time close off connection between ports 45 and 46.

In the arrangement illustrated in the drawings, an individual brake booster unit 30 is provided for the individual leveling strut 16 and it will be understood that four such booster units 30 may be applied to a single vehicle to thereby provide individual, automatically variable, braking pressures to the individual four vehicle wheels. This individual control is very desirable in some heavy duty vehicles and other vehicles intended for a high percentage of use on icy roads. However, in conventional passenger car use, it would ordinarily be sufficient to provide two brake booster units 30, with one applying an output pressure, as at conduit 40, to the front vehicle wheels, equally, and the other providing an equal pressure to the rear vehicle wheels. Such an arrangement provides extremely satisfactory brake pressure variation for changes in passenger load and/or forward and rearward shifts of the vehicle body during deceleration and acceleration respectively.

In connecting multiple brake booster units as above described, the conduit 34 shown in FIGURE 1 will be divided into a plurality of branches, one branch leading to each brake booster. Likewise, if two booster units are utilized with each leading to a pair of individual wheel brakes, the output line 40 from the individual brake booster unit will be divided into two branches, one leading to each of the controlled vehicle wheels.

It will thus be seen that I have provided a novel vehicle suspension and braking system wherein the braking effort applicable to the individual wheel brakes is capable of variation with the vehicle load on the individual wheel. It has been found that by reducing the braking pressure at the individual vehicle wheels, with a reduction in vehicle load on that wheel, there is substantially less tendency of the wheel to lock up and thereby induce vehicle skid. Accordingly, as a result of the present invention substantially increased control is achieved over the vehicle during braking and the effects of vehicle weight shift, insofar as such shifts ordinarily reduce the operator's control over the vehicle during braking, are materially reduced.

It will, of course, be evident to those skilled in the art that variations of modifications may be made in the structures above set forth without departing from the scope of the novel concept to the present invention. Accordingly, it is my intention that the scope of the present invention be limited solely by that of the hereinafter claims.

I claim as my invention:

1. A vehicle brake apportioning system to compensate braking force upon changes in wheel loading due to variable static loading and weight transfer due to acceleration, comprising, in combination with a master cylinder for increasing the pressure of a supply of fluid, a brake power booster comprising, a braking piston having a first piston portion at one end and an enlarged second piston portion at its opposite end, said braking piston having a first cylinder recess formed in said opposite end, a control piston having at one end thereof a first portion received in said first cylinder recess and having a second portion forming a second control piston portion at its opposite end, a housing for said booster having a control piston cylinder receiving said control piston, an enlarged second cylinder for said enlarged second piston portion of said braking piston, and a reduced braking piston cylinder receiving said first piston portion of said braking piston, a first spring bottomed in said first cylinder recess and engaged against said control piston to preload said pistons apart, and a second return spring bottomed against said housing and against said braking piston to load the braking piston in one direction, means transmitting fluid at increased pressure from said master cylinder to said control piston cylinder, whereby said control piston through said first spring tends to move said braking piston against the bias of said return spring, thereby to move fluid out of said reduced braking piston cylinder to a brake, a pressure device for supplying fluid under pressure as a function of changes of wheel loading, means including valving passages formed in said control piston and said enlarged second piston portion at said first cylinder recess supplying fluid from said pressure device to said enlarged second cylinder upon movement of said control piston relative to said braking piston, thereby providing a power boost acting against the fluid confined in said reduced braking piston cylinder to apply a braking force proportional to the changes in wheel loading, said housing and said control piston having other valving passages operable to vent said first cylinder recess and said enlarged second cylinder upon return movement of said braking piston.

2. In a vehicle brake apportioning system, a brake power booster comprising a braking piston and cylinder having an enlarged booster end and a reduced brake end, a control piston and cylinder for receiving pressurized fluid from the master brake cylinder, said control piston having a portion extending into said enlarged booster end of said braking piston in a piston-cylinder relation, a first spring between said control piston and said braking piston to load the respective pistons apart, valve lands and recesses formed between said control piston and said enlarged booster end of said braking piston to develop a valving function upon relative movement therebetween, a second spring preloading said braking piston in one direction, and means for supplying fluid under pressure as a function of changes of wheel loading to said valve recesses in said control piston, whereby movement of said control piston in response to increased pressure from the master brake cylinder will move said braking piston through said first spring against the bias of said second spring, thereby to supply fluid under pressure to the brake and upon movement of said control piston relative to said braking piston fluid under pressure will act on said enlarged booster end of said braking piston to provide a power boost for proportionalizing the braking force to changes in wheel loading.

References Cited in the file of this patent

UNITED STATES PATENTS

| | | |
|---|---|---|
| 1,096,493 | Doyle et al. | May 12, 1914 |
| 1,694,951 | Reynolds | Dec. 11, 1928 |
| 1,922,227 | Brecht | Aug. 15, 1933 |
| 2,150,576 | Bell | Mar. 14, 1939 |
| 2,318,756 | Chouings | May 11, 1943 |
| 2,328,637 | Freeman | Sept. 7, 1943 |
| 2,407,097 | Porter | Sept. 3, 1946 |